United States Patent [19]
Fleischer et al.

[11] Patent Number: 6,020,442
[45] Date of Patent: *Feb. 1, 2000

[54] OXIDIZED POLYARYLENE SULFIDES

[75] Inventors: Dietrich Fleischer, Darmstadt; Heinz Strutz, Usingen; Jürgen Kulpe, Frankfurt am Main; Andreas Schleicher, Einhausen, all of Germany

[73] Assignee: Ticona GmbH, Germany

[*] Notice: This patent is subject to a terminal disclaimer.

[21] Appl. No.: 08/585,267

[22] Filed: Jan. 11, 1996

Related U.S. Application Data

[63] Continuation of application No. 08/237,056, May 3, 1994, abandoned.

[30] Foreign Application Priority Data

May 4, 1993 [DE] Germany .............................. 43 14 735

[51] Int. Cl.$^7$ .................................................. C08L 81/00
[52] U.S. Cl. ............................................ 525/537; 528/388
[58] Field of Search .............................. 525/537; 528/388

[56] References Cited

U.S. PATENT DOCUMENTS

| | | |
|---|---|---|
| 3,303,007 | 2/1967 | Mueller . |
| 3,303,087 | 2/1967 | Smith et al. . |
| 3,326,865 | 6/1967 | Smith et al. . |
| 3,354,129 | 11/1967 | Edmonds, Jr. et al. ............... 528/388 |
| 3,948,865 | 4/1976 | Brady et al. . |
| 4,383,080 | 5/1983 | Dupree ................................... 525/537 |

FOREIGN PATENT DOCUMENTS

| | | |
|---|---|---|
| 091 088 | 10/1983 | European Pat. Off. . |
| 1 938 806 | 3/1972 | Germany . |
| 1 365 486 | 9/1974 | United Kingdom . |
| 91/18041 | 11/1991 | WIPO . |

OTHER PUBLICATIONS

Journal of Polymer Science, Polymer Letters Edition, vol. 9, Nr. 2, Feb. 1971, New York, pp.91–94.

Kobunshi Ronbunshu (Japanese Polymer Science and Technology) vol. 37, Nr. 6, Jun. 1980, pp. 445–448.

*Primary Examiner*—Helen L. Pezzuoto
*Attorney, Agent, or Firm*—Connolly, Bove, Lodge & Hutz LLP

[57] ABSTRACT

Oxidation product of polyarylene sulfides comprising recurring units of the formula

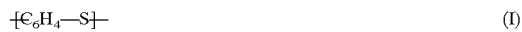 (I)

in the form of a compound comprising recurring units of the formula

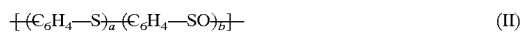 (II)

in which the sulfur/oxygen ratio is from 1:0.1 to 1:1, the sum of a and b always being 1 and a and b each being greater than zero or with the proviso that a is zero if b is 1.

11 Claims, No Drawings

OXIDIZED POLYARYLENE SULFIDES

This application is a continuation of Ser. No. 08/237,056, filed on May 3, 1994, now abandoned.

The invention relates to polyarylene sulfides/sulfoxides and polyarylene sulfoxides which have a defined sulfur/oxygen ratio.

Polyarylene sulfides have been known for some time. Owing to their high heat distortion temperature and good resistance to chemicals, these polymers are employed for components on which high demands are made. However, some applications have higher material requirements. Specifically, an increase in the glass transition temperature of the polymers is frequently desirable. This is supposed to be achieved by a polymer-analogous oxidation of polyphenylene sulfide to polyphenylene sulfoxide in acetic acid using concentrated nitric acid for 24 hours at from 0 to +5° C. (U.S. Pat. No. 3,303,087). However, the property values given for the polymer formed indicate that no polymer having a sulfur/oxygen ratio of 1 to 1 was obtained, since the values for the heat distortion temperature have not been increased. The term "polymer-analogous" means the conversion of one polymer into another. Disadvantages of the process are firstly the long reaction times required, secondly the possibility of electrophilic addition and thirdly the acid attack of the strong mineral acid on the thioether bond with long reaction times (degradation reactions).

It is an object of the invention to develop oxidation products of polyarylene sulfides which are simple to prepare and have a defined sulfur/oxygen ratio.

The invention provides an oxidation product of a polyarylene sulfide comprising recurring units of the formula

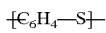  (I)

comprising a compound comprising recurring units of the formula

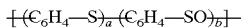  (II)

in which the sulfur/oxygen ratio is from 1:0.1 to 1:1, the sum of a and b always being 1, with the proviso that a is zero if b is 1.

The oxidation of polymeric arylene sulfides with ozone leads to the formation of polyarylene sulfoxides with high selectivity. This is all the more surprising since ozone is an extremely strong oxidant. Appropriate use of the amount of ozone makes it possible either to convert the sulfur bond completely into the sulfoxide bond or to achieve any desired S/O ratio in the polymer chain, the selection of the suspension medium used having a decisive influence.

Polymers of the formula (I) which can be used are generally 1,4-linked polyarylene sulfides which can have a proportion of up to 30 mol % of a 1,2- and/or 1,3-linkage at the aromatic ring.

Preference is given to polyphenylene sulfide (PPS), the preparation process of which is described, for example, in the U.S. Pat. Nos. 3,354,129, 3,919,177, 4,038,262 and 4,282,347.

Suitable polymers for the invention are generally those having an average molecular weight of from 4000 to 200,000, preferably from 10,000 to 150,000, in particular from 25,000 to 100,000, determined by GPC.

The particle size of the polymers used generally lies in the range from $5\times10^{-6}$ to $500\times10^{-6}$ m, preferably from $10\times10^{-6}$ to $300\times10^{-6}$ m and in particular from $10\times10^{-6}$ to $200\times10^{-6}$ m.

The reaction temperatures lie in the range from −10 to +80° C., preferably from 0 to 50° C.. The reaction time required depends on the supply of ozone and on the reactor type selected and is generally from 1 minute to 2 hours, preferably from 5 to 90 minutes and in particular from 5 to 60 minutes. However, it is also possible to reduce times to below 1 minute when optimizing the reaction conditions.

The oxidation according to the invention is carried out in an ozone-containing gas stream in which the ozone is generally present in a concentration of from 0.1 to 9% by volume, preferably from 2 to 6% by volume. Suitable carrier gases for the ozone are oxygen or inert gases such as nitrogen or else mixtures thereof. Likewise, dried air can be used in the generation of the ozone. The ozone is generally generated by methods known in the art, for example by silent electric discharge.

The reaction is carried out in a reaction vessel which is suitable for gassing reactions and the temperature of which can be controlled. This can be, for example, a gassed stirred reactor or a bubble column.

Suitable suspension media are all liquid compounds which are inert under the reaction conditions, for example water, lower aliphatic alcohols and carboxylic acids each having 1–6, preferably 1–3, carbon atoms in the alkyl group, the esters of the two abovementioned classes of compound, hydrocarbons having 1–12 carbon atoms which may be halogenated with chlorine or fluorine, and mixtures of the specified compounds. Mineral acids, for example concentrated sulfuric acid, are also suitable. In protic solvents or solvent mixtures containing protic solvents, the addition of a mineral acid, for example sulfuric acid, can be advantageous.

For example, in methylene chloride complete oxidation to the sulfoxide is achieved in a short time. In contrast, the use of lower aliphatic carboxylic acids with an addition of a mineral acid achieves only partial oxidation, since the takeup rate of the ozone drops significantly on reaching a sulfur/oxygen ratio of 1:0.5. Although it is possible to achieve complete oxidation here too, this requires uneconomically long reaction times.

The suspension medium generally dissolves none or only very small amounts of the polymer, but it functions as heat and ozone transfer medium and has a controlling influence on the selectivity. Although the reaction can also be carried out in a non-liquid phase, vigorous mixing of the polymer powder then has to be ensured, since otherwise a hot spot can occur at the point of ozone introduction, which occurrence has a negative effect on the oxidation selectivity.

The compounds obtained according to the invention either can be thermoplastically processed or can, for example, be further processed by customary sintering processes, but this is dependent on their melting points. The first group can be converted by the processing methods customary for thermoplastics, for example injection molding or extrusion, into molded and functional parts. The molding compositions can also contain known pulverulent fillers such as chalk, talc, clay, mica and/or fibrous reinforcements such as glass and carbon fibers, whiskers, and also further customary additives and processing aids, for example lubricants, mold release compositions, anti-oxidants and UV stabilizers. Such parts are used as functional components on which high demands can be made, for example in aircraft and automobile constructions and also in the construction of chemical apparatus.

The second group, i.e. the polymers processible by sintering processes, are used in functional parts exposed to high temperatures and aggressive chemicals.

EXAMPLES

1) Polyphenylene Sulfoxide (PPSO)

54.1 g of a polyphenylene sulfide (PPS) powder (MW 40,000) having an average particle diameter of $20 \times 10^{-6}$ m were suspended in 400 ml of methylene chloride in a reaction vessel fitted with a disk stirrer. Ozone-containing gas was passed into the suspension at temperatures of from $-5$ to $-7°$ C. until 0.5 mol of ozone had been absorbed (72 minutes). The ozone concentration during gassing was from 51 to 115 gram per cubic meter of carrier gas. After the reaction the polymer powder was filtered off with suction and dried. In the infrared spectrum, only the exclusive formation of sulfoxide groups could be observed. $T_g$: 240° C., $T_m$: $\leq 370°$ C. (decomposition).

Elemental analysis: $C_6H_4SO$ C 58.04 H 3.25 S 25.82 O 12.89 (calc.) C 58.3 H 3.5 S 25.45 O 12.75 (found)

The sulfur/oxygen ratio of the polymer obtained was 1:1.

2) Polyphenylene Sulfide Sulfoxide (PPS/SO)

216 g of a PPS powder as in Example 1 were suspended in a mixture of 850 ml of glacial acetic acid and 8.5 ml of sulfuric acid in a bubble column (5 cm in diameter, 120 cm in length), the temperature of which could be controlled. At from 10 to 20° C., the suspension was gassed via a glass frit with an ozone-containing gas stream (flow rate 180–200 l/h) having a concentration of from 50 to 100 gram of ozone per cubic meter of gas. After 80 minutes, the reaction was stopped after absorption of 48 g of ozone, because a significant drop in the reaction rate became apparent at this point in time. Subsequently, the polymer powder was filtered off, washed a number of times with small amounts of water and then dried at 30 mbar and 50–100° C.

In the IR spectrum, only sulfoxide groups can be recognized.

The sulfur/oxygen ratio of the polymer obtained was 1:0.51.

We claim:

1. An oxidized polyarylene sulfide in which a portion of recurring units of the formula

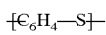

has been oxidized, said polyarylene sulfide having been oxidized while in particulate form, said oxidized polyarylene sulfide consisting essentially of recurring units of the formula

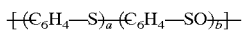

which:

the sulfur/oxygen ratio is from 1:0.1 to 1:1, and a and b are each greater than zero but their sum is always 1;

said oxidized polyarylene sulfide having remained in particulate form throughout the oxidation and having an infrared spectrum indicating essentially selective oxidation of the arylene sulfide groups to arylene sulfoxide groups.

2. An oxidized polyarylene sulfide as claimed in claim 1, wherein said —$C_6H_4$—S— units and said —$C_6H_4$—SO— units are at least 70 mol-% 1,4-linked into the oxidized polyarylene sulfide chain, up to 30 mol-% of said units being 1,2-linked or 1,3-linked or a combination of 1,2- and 1,3-linked units.

3. An oxidized polyarylene sulfide as claimed in claim 1, wherein the average molecular weight of said oxidized polyarylene sulfide ranges from 4000 to 200,000, as determined by GPC.

4. An oxidized polyarylene sulfide as claimed in claim 3, wherein said molecular weight ranges from 25,000 to 100,000, as determined by GPC.

5. An oxidized polyarylene sulfide as claimed in claim 1, wherein said oxidized polyarylene sulfide is particulate, the particles of said oxidized polyarylene sulfide ranging in size from $5 \times 10^{-6}$ to $500 \times 10^{-6}$ m.

6. An oxidized polyarylene sulfide as claimed in claim 5, wherein said particles range in size from $10 \times 10^{-6}$ to $200 \times 10^{-6}$ m.

7. A sintered particulate mass comprising an oxidized polyarylene sulfide as claimed in claim 5.

8. A molding composition comprising an oxidized polyarylene sulfide as claimed in claim 5 and a filler material, reinforcing additive, or processing additive.

9. An oxidized polyarylene sulfide as claimed in claim 1, wherein said portion of said recurring units has been oxidized with an ozone-containing gas.

10. An oxidation product as claimed in claim 1, consisting essentially of recurring units of the formula

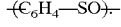

11. An oxidation product as claimed in claim 1, wherein said —$C_6H_4$—S— units and said —$C_6H_4$—SO— units are at least 70 mol-% 1,4-linked into the chain of recurring units of said formula II.

* * * * *